US012354581B2

(12) United States Patent
Kontomichos et al.

(10) Patent No.: US 12,354,581 B2
(45) Date of Patent: Jul. 8, 2025

(54) METHOD FOR AUTOMATICALLY DESIGNING A FEEDFORWARD FILTER

(71) Applicant: Dialog Semiconductor B.V., 's-Hertogenbosch (NL)

(72) Inventors: Fotios Kontomichos, Patras (GR); Wessel Harm Lubberhuizen, Hengelo (NL)

(73) Assignee: Renesas Design Netherlands B.V., 's-Hertogenbosch (NL)

( * ) Notice: Subject to any disclaimer, the term of this patent is extended or adjusted under 35 U.S.C. 154(b) by 240 days.

(21) Appl. No.: 17/900,236

(22) Filed: Aug. 31, 2022

(65) Prior Publication Data

US 2024/0071350 A1 Feb. 29, 2024

(51) Int. Cl.
*G10K 11/16* (2006.01)
*H04R 1/10* (2006.01)

(52) U.S. Cl.
CPC .......... *G10K 11/16* (2013.01); *H04R 1/1083* (2013.01); *G10K 2210/3027* (2013.01)

(58) Field of Classification Search
CPC .......... G10K 11/16; G10K 2210/3027; H04R 1/1083
See application file for complete search history.

(56) References Cited

U.S. PATENT DOCUMENTS

| | | | |
|---|---|---|---|
| 5,182,774 | A | 1/1993 | Bourk |
| 5,425,105 | A | 6/1995 | Lo et al. |
| 6,278,786 | B1 | 8/2001 | McIntosh |
| 6,683,960 | B1 | 1/2004 | Fujii et al. |
| 8,798,283 | B2 | 8/2014 | Gauger, Jr. et al. |
| 9,437,182 | B2 | 9/2016 | Doclo |
| 9,837,066 | B2 | 12/2017 | Wurtz |
| 10,034,092 | B1 | 7/2018 | Nawfal et al. |
| 10,950,213 | B1 | 3/2021 | Lu et al. |
| 11,189,261 | B1 | 11/2021 | Lu et al. |
| 11,303,258 | B1 | 4/2022 | Bajic et al. |
| 11,404,040 | B1 | 8/2022 | Kontomichos et al. |
| 2004/0264706 | A1 | 12/2004 | Ray et al. |
| 2010/0002889 | A1 | 1/2010 | Jorgensen et al. |
| 2010/0166206 | A1 | 7/2010 | Macours |
| 2011/0007907 | A1 | 1/2011 | Park et al. |
| 2012/0170766 | A1 | 7/2012 | Alves et al. |
| 2012/0250873 | A1 | 10/2012 | Bakalos et al. |
| 2014/0126734 | A1 | 5/2014 | Gauger, Jr. et al. |
| 2014/0314245 | A1 | 10/2014 | Asada et al. |

(Continued)

FOREIGN PATENT DOCUMENTS

EP 3480809 A1 5/2019

OTHER PUBLICATIONS

Non-Final Rejection dated May 25, 2023 received in U.S. Appl. No. 17/748,166.

(Continued)

*Primary Examiner* — David L Ton
(74) *Attorney, Agent, or Firm* — SCULLY, SCOTT, MURPHY & PRESSER, P.C.

(57) ABSTRACT

A computer-implemented method for automatically designing a feedforward filter that is optimized for an audio transparency mode of operation of an audio device, the audio device comprising the feedforward filter and a feedback filter, the method comprising optimizing the feedforward filter for the audio transparency mode of operation, wherein optimization of the feedforward filter is dependent on the feedback filter.

17 Claims, 8 Drawing Sheets

(56) References Cited

U.S. PATENT DOCUMENTS

| | | | |
|---|---|---|---|
| 2016/0196819 A1 | 7/2016 | Wurtz | |
| 2016/0300563 A1 | 10/2016 | Park | |
| 2017/0125006 A1 | 5/2017 | Dzhigan et al. | |
| 2021/0082387 A1 | 3/2021 | Ku et al. | |
| 2022/0322002 A1 | 10/2022 | O'Connell | |

OTHER PUBLICATIONS

Notice of Allowance dated Feb. 8, 2023 received in U.S. Appl. No. 17/334,167.

"Analog and Digital State-Space Adaptive IIR Filters", by David A.Johns, Thesis submitted to the Department of Electrical Engineering, University of Toronto, Mar. 1989, 153 pages.

"Algorithms for the Constrained Design of Digital Filters with Arbitrary Magnitude and Phase Responses", by Mathias Lang, Dissertation, Jun. 1999, 232 pages.

"Optimal Feedback Control Formulation of the Active Noise Cancellation Problem: Pointwise and Distributed", by Kambiz C. Zangi, Research Laboratory of Electronics Technical Report No. 583, MIT, Cambridge, Massachusetts, May 1994, 158 pages.

"Optimal Design of Digital IIR Filters by Model-Fitting Frequency Response Data", by Arnab K. Shaw, IEEE Transactions on Circuits and Systems—II: Analog and Digital Signal Processing, vol. 42, No. 11, Nov. 1995, pp. 702-710.

"Adaptive Feedback Active Noise Control Headset: Implementation, Evaluation and Its Extension", by Woon S. Gan et al., IEEE Transactions on Consumer Electronics (vol. 51, Issue: 3, Aug. 2005), pp. 975-982.

"Frequency Warping, Basic Concepts, Operators and Transforms", by Unto K. Laine, Found: users.spa.aalto.fi/unski/FreqW.html, pp. 1-4, Frequency_Warping.html, Dec. 12, 2019.

"Direct Design of Parallel Second-Order Filters for Instrument Body Modeling", by Balazs Bank, International Computer Music Conference, Proceedings vol. 1, pp. 458-465, Copenhagen, Denmark, Aug. 2007.

"$H_2/H\infty$ Active Control of Sound in a Headrest: Design and Implementation", by Boaz Rafaely et al., IEEE Transaction on Control Systems Technology, vol. 7, No. 1, Jan. 1999, pp. 79-84.

"Improved Pole Positioning for Parallel Filters Based on Spectral Smoothing and Multi-Band Warping", by Balazs Bank et al., IEEE Signal Processing Letters, vol. 18, No. 5, May 2011, pp. 299-302.

"On $H\infty$-Optimal Sensitivity Theory for SISO Feedback Systems", by Bruce A Francis et al., IEEE Transactions on Automatic Control, vol. AC-29, No. 1, Jan. 1984, pp. 9-16.

"Perceptually Motivated Audio Equalization Using Fixed-Pole Parallel Second-Order Filters", by Balazs Bank, IEEE Signal Processing Letters, vol. 15, May 23, 2008, pp. 477-480.

"Loudspeaker and Room Response Equalization Using Parallel Filters: Comparison of Pole Positioning Strategies", by Balazs Bank, AES, 51st International Conference: Loudspeakers and Headphones, Helsinki, Finland, Aug. 22-24, 2013, pp. 1-10.

"Frequency-Domain Steiglitz-McBride Method for Least-Squares IIR Filter Desig, ARMA Modeling, and Periodogram Smoothing", by Leland B. Jackson, IEEE Signal Processing Letters, vol. 15, Jan. 4, 2008, pp. 49-52.

"Frequency-Warped Signal Processing for Audio Applications", by Aki Harma et al., Journal of Audio Engineering Society, vol. 48, No. 11, Nov. 2000, pp. 1011-1031.

"Measuring Short Impulse Responses With Inverse Filtered Maximum-Length Sequences", by Pedro Cobo et al., Elsevier, Applied Acoustics, vol. 68, Issue 7, Jul. 2007, pp. 820-830.

MATLAB and Simulink Robotics Arena, "Introduction to Filter Design," by Connell D/Souza et al., Mar. 6, 2018, https://www.youtube.com/watch?v=VFt3UVw7VrE.

"An Evolution-Driven Analog Circuit Topology Synthesis" by Ziga Rojec et al., 2016 IEEE Symposium Series on Computational Intelligence (SSCI), Dec. 2016, pp. 1-6, doi: 10.1109/SSCI.2016.7850184.

"Design of an Efficient Active Noise Cancellation Circuit for In-ear Headphones," by Kuan-Hung Chen et al., 2014 IEEE Asia Pacific Conference on Circuits and Systems (APCCAS), Nov. 17-20, 2014, pp. 599-602.

"A Circuit Representation Technique for Automated Circuit Design," by Jason D. Lohn et al., IEEE Transactions on Evolutionary Computation, vol. 3, No. 3, Sep. 1999, pp. 205-219.

Autodesk Library.IO, "Datasheet to model in seconds, Parametric ECAD—MCAD content generation online, the Wayback Machine"—https://web.archive.org/web.20181231233511/https://library.io/ Downloaded: Aug. 3, 2021, 11:18 AM, pp. 1-4.

U.S. Office Action, U.S. Appl. No. 16/720,358, Applicant: Kontomichos et al., Mail date: Aug. 27, 2020, 16 pages.

U.S. Office Action, U.S. Appl. No. 16/720,358, Applicant: Kontomichos et al., Mail date: Dec. 15, 2020, 13 pages.

U.S. Office Action, U.S. Appl. No. 16/720,358, Applicant: Kontomichos et al., Mail date: Apr. 16, 2021, 13 pages.

U.S. Office Action, U.S. Appl. No. 16/720,358, Applicant: Kontomichos et al., Mail date: Jul. 22, 2021, 18 pages.

U.S. Notice of Allowance, U.S. Appl. No. 16/720,358, Applicant: Kontomichos et al., Mail date: Mar. 14, 2022, 7 pages.

"Adapting Hearing Devices to the Individual Ear Acoustics: Database and Target Response Correction Functions for Various Device Styles", by Florian Denk et al., Trends in Hearing, vol. 22: 1-19, 2018.

"Equalization filter design for achieving acoustic transparency in a semi-open fit hearing device", by Florian Denk et al., Speech Communication; 13th ITG—Symposium, VDE, 2018.

Non-Final Rejection dated Aug. 31, 2022 received in U.S. Appl. No. 17/334,167.

"Control Tutorials for MATLAB and Simulink—Introduction: Frequency Domain Methods for Controller Design", webpage accessed Nov. 18, 2022, https://ctms.engin.umich.edu/CTMS/index.php/Content/Suspension/Simulink/Modeling/Content/Animations/bbgui.fig?example=Introduction&section=ControlFrequency.

"Stability Criteria—(Gain Margin and Phase Margin)", published Sep. 2000, gonzo@mit.edu, URL: https://www.mit.edu/afs.new/athena/course/2/2.010/www_f00/psets/hw3_dir/tutor3_dir/tut3_g.html.

US Non-Final Office Action dated Mar. 13, 2025 issued in U.S. Appl. No. 18/066,332.

METHOD FOR AUTOMATICALLY DESIGNING A FEEDFORWARD FILTER

The present disclosure relates to a method for automatically designing a feedforward filter. In particular the present disclosure relates to a method for automatically designing a feedforward filter that is optimized for a transparency mode of operation within an audio system.

BACKGROUND

Modern hearing devices come in a variety of different designs and form factors, no less in regard to headphones. Hearing devices, such as headphones and hearing aids include advanced digital signal processors that are able to perform a variety of sophisticated audio manipulation operations to cater to the listener's needs.

One such operation that modern audio devices are capable of performing is a transparency or talk-through operation. During this operation the background ambient soundscape is captured via a microphone and then reproduced in the audio device's speaker. Transparency operations are especially critical to the functioning of hearing aid devices, in which this mode of operation is their primary application.

Modern audio devices can incorporate one or more microphones. The two most common types of audio capture paths determined by the corresponding microphone operation are from feedforward (commonly abbreviated to "FF") and feedback (commonly abbreviated to "FB") microphones.

The feedforward microphones are located externally on the audio device so that during operation they are able to capture the background ambient sounds before they reach the audio device and the listener's eardrums.

A feedback microphone is placed internally within the audio device, in close proximity to the speaker drivers, to capture soundwaves close to the eardrums.

Audio devices that are capable of transparency operations contain one or more audio filters. Audio filters can selectively attenuate or amplify a range of frequencies from sounds entering the microphone. To perform a transparency operation, the audio filters are required to be tuned. The following is the conventional, and laborious, method for tuning.

Acoustical measurements are taken for the purpose of defining the appropriate system transfer functions.

These acoustic measurements are utilised to design the feedforward filter to achieve the required transparency frequency response.

Once the feedforward filter has been applied the frequency response of the audio device is validated through acoustic testing.

SUMMARY

It is an object of the disclosure to provide a method of designing a feedforward filter an audio transparency operation that is more efficient and/or more accurate than existing methods.

According to a first aspect of the disclosure there is provided a computer-implemented method for automatically designing a feedforward filter that is optimized for an audio transparency mode of operation of an audio device, the audio device comprising the feedforward filter and a feedback filter, the method comprising optimizing the feedforward filter for the audio transparency mode of operation, wherein optimization of the feedforward filter is dependent on the feedback filter.

Optionally, optimizing the feedforward filter comprises determining one or more properties of the feedforward filter.

Optionally, the one or more properties of the feedforward filter comprises a feedforward filter transfer function.

Optionally, the feedforward filter transfer function is determined by determining one or more filter coefficients of the feedforward filter.

Optionally, a property of the feedback filter comprises a feedback filter transfer function, and the determination of the feedforward filter transfer function is dependent on the feedback filter transfer function.

Optionally, the audio device comprises a speaker driver, a feedforward path comprising the feedforward filter and a feedforward microphone, and a feedback path comprising the feedback filter and a feedback microphone.

Optionally, the audio device comprises a first transfer function, the first transfer function being a passive frequency response of the audio device on a listener's ear.

Optionally, the feedforward filter transfer function is designed to compensate for the first transfer function, thereby optimizing the feedforward filter for the audio transparency mode of operation.

Optionally, determining the feedforward filter transfer function comprises providing a system transfer function of the audio device that is dependent on the speaker driver, the feedforward path and the feedback path of the audio device, defining a relationship between a target transfer function, the system transfer function and the first transfer function, and determining a value of the feedforward filter transfer function that compensates for the first transfer function using the target transfer function.

Optionally, determining the value of the feedforward filter transfer function that compensates for the first transfer function using the target transfer function comprises applying a regression method.

Optionally, a) the feedforward path comprises i) a second transfer function between an ambient noise source and the feedforward microphone, ii) the feedforward filter transfer function between an output of the feedforward microphone and an input of the speaker driver, iii) a third transfer function between the speaker driver and a user's ear, and b) the feedback path comprises i) a fourth transfer function between the ambient noise source and the feedback microphone, ii) the feedback filter transfer function between an output of the feedback microphone and the input of the speaker driver, and iii) a fifth transfer function between an input of the feedback microphone and an output of the speaker driver, and the audio device further comprises the first transfer function between the ambient noise source and the user's ear, and a sixth transfer function between the output of the speaker driver and an input of the feedforward microphone.

Optionally, optimizing the feedforward filter comprises determining a value of the feedforward filter transfer function that provides a stable feedforward filter.

Optionally, determining the value of the feedforward filter transfer function that provides a stable feedforward filter comprises determining a value of the feedforward filter transfer function that provides i) an argument of the multiplication of the feedforward filter transfer function and the sixth transfer function for a first phase frequency that is equal to minus pi and a magnitude of the multiplication of the feedforward filter transfer function and the sixth transfer function for the first phase frequency that is less than one, or ii) an argument of the multiplication of the feedforward filter transfer function and the sixth transfer function for a first gain frequency that is less than minus pi and a magnitude of the multiplication of the feedforward filter transfer function and the sixth transfer function for the first gain frequency that is equal to one.

Optionally, the method comprises acquiring at least one of the first, second, third, fourth, fifth or sixth transfer functions.

Optionally, acquiring the at least one of the first, second, third, fourth, fifth or sixth transfer functions comprises measuring the at least one of the first, second, third, fourth, fifth or sixth transfer functions over a plurality of incident angles, and determining an average of the at least one of the first, second, third, fourth, fifth or sixth transfer functions measured over the plurality of incident angles.

Optionally, determining an average of the at least one of the first, second, third, fourth, fifth or sixth transfer functions comprises determining a magnitude average and/or determining a phase average.

Optionally, the method comprises optimizing the feedback filter prior to optimizing the feedforward filter.

Optionally, optimizing the feedback filter comprises determining one or more properties of the feedback filter.

Optionally, the one or more properties of the feedback filter comprise a feedback filter transfer function.

According to a second aspect of the disclosure there is provided an automatic feedforward filter design tool for designing a feedforward filter of an audio device, the audio device comprising the feedforward filter and a feedback filter, the tool being configured to optimize the feedforward filter for the audio transparency mode of operation wherein, optimization of the feedforward filter is dependent on the feedback filter.

Optionally, the audio device is configured to be operable in the audio transparency mode and/or in a noise cancellation mode.

Optionally, the audio device is implemented within a headset, headphones, a hearing aid, or a personal amplification device.

It will be appreciated that the automatic feedforward filter design tool of the second aspect may include features set out in the first aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 1B:
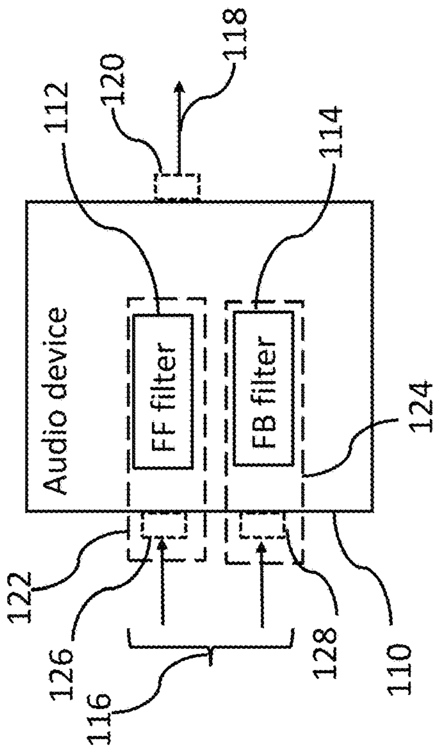
FIG. 1(*a*) is a flow chart of a method in accordance with a first embodiment of the present disclosure, FIG. 1(*b*) is a schematic of an audio device that the method of FIG. 1(*a*) may be applied in relation to in accordance with an embodiment of the present disclosure.
Figure 1A:
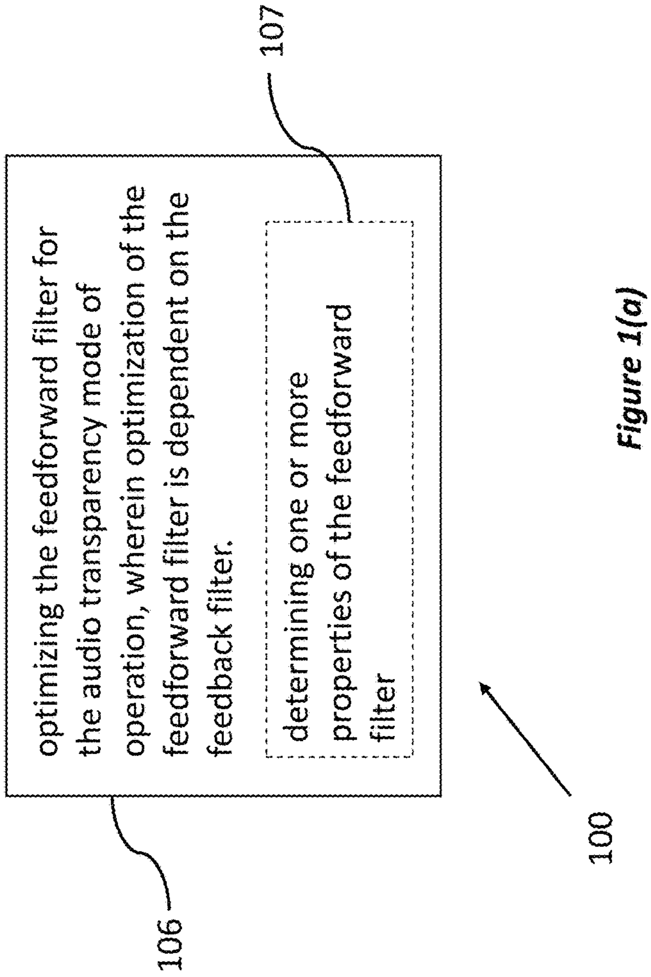

FIG. 1(*a*) is a flow chart of a method 100 for automatically designing a feedforward filter that is optimized for an audio transparency mode of operation of an audio device in accordance with a first embodiment of the present disclosure.

FIG. 1(*b*) is a schematic of an audio device 110 that the method 100 may be applied in relation to in accordance with an embodiment of the present disclosure.

The audio device 110 comprises a feedforward filter 112 and a feedback filter 114. In operation, the audio device 110 receives an input signal 116, for example relating to ambient noise in the environment. The input signal 116 is then processed by the audio device 110 and provided as an output signal 118 to a listener. In the audio transparency mode, the audio device 110 may process the input signal 116 to provide an output signal 118 that is, in simplified terms, the evolution of the input signal 116 at different points in space. The similarity of the signals 116, 118 depends on the distance of the loudspeaker, that provides the output signal 118, in relation to a user's eardrum and on the acoustics of the audio device 110.

For example, where the audio device 110 is a headset, the ambient noise from the environment will be attenuated due to the impact of the headset covering the user's ears. In transparency mode, the audio device 110 acts to generate and provide the output signal 118 that is the same as, or an approximation of, the ambient environmental noise that would be heard by the user if they were not wearing the headset. This is achieved by effectively cancelling the influence of the headset attenuation. It will be appreciated that the ambient noise may include a third party's voice, such that the transparency mode can be used to enable the user to hear a third party speaking with them, without having to remove their headset.

It will be appreciated that in the transparency mode of operation, the output signal 118 does not need to exactly match the input signal 116, and specific embodiments may favour attenuating or amplifying specific audio frequencies as appropriate. For example, a specific application may favour permitting passage of, and possibly amplifying, audio frequencies associated with a human voice, whilst attenuating unwanted higher and/or lower frequencies. Such a configuration may be beneficial for hearing aid applications or for personal amplification devices.

In a specific embodiment the audio device 110 may comprise a speaker driver 120, a feedforward path 122 and a feedback path 124. The feedforward path 122 may comprise the feedforward filter 112 and a feedforward microphone 126. The feedback path 124 may comprise the feedback filter 114 and a feedback microphone 128.

In a specific embodiment, the optional utilization of the feedback path 124 in a noise cancelation mode can allow the audio device 100 to enhance the perception of speech by attenuating lower frequency noises. In such a manner, masking some of the speech components by external noise is reduced and speech intelligibility is increased.

As discussed previously, the audio device 110 itself may lead to an attenuation of the ambient noise from the environment. This may be defined by a transfer function $H_{AE}$ that represents a passive frequency response of the audio device 110 at the ear of the listener.

Returning to FIG. 1(*a*), the method 100 comprises optimizing the feedforward filter 112 for the audio transparency mode of operation, thereby optimizing the audio device 110 for the audio transparency mode of operation, at a step 106. Optimization of the feedforward filter 112 is dependent on the feedback filter 114.

In the present method 100, as the optimisation of the feedforward filter 112 is dependent on the feedback filter 114 there is provided a more precise method of optimization compared with known methods.

Specifically, known methods do not consider the feedback path, including the feedback filter, as it is typically not viewed as being relevant for the transparency mode. However, this results in a lack of flexibility and precision when compared to the present disclosure which considers both the feedback and feedforward paths in the optimisation process for audio transparency.

Furthermore, the present disclosure relates to an automatic method of optimised feedforward filter design whereas most known methods are manual, which are inefficient compared with the methods as disclosed herein.

Optimizing the feedforward filter 112 may comprise determining one or more properties of the feedforward filter 112, as illustrated by step 107.

A property of the feedforward filter 112 that is determined to provide the optimised feedforward filter 112 may be a feedforward filter transfer function $H_{FF}$. The feedforward filter transfer function $H_{FF}$ may be determined, for example, by determining one or more filter coefficients of the feedforward filter 112. The feedforward filter transfer function $H_{FF}$ may be described in terms of its magnitude and/or phase.

To provide an optimised audio device 110 for the audio transparency mode of operation, the feedforward filter transfer function $H_{FF}$ may be designed to compensate for the transfer function $H_{AE}$.

In a specific embodiment, the feedback filter 114 may be designed prior to designing of the feedforward filter 112. The feedback filter 114 may be designed by determining one or more properties of the feedback filter 114, for example by determining its transfer function $H_{FB}$. Therefore, specific embodiments of the present disclosure provide methods to optimise the feedforward path in the presence of a previously tuned feedback path to achieve an optimal and reliable hybrid "transparency" frequency response.

A detailed end-product "transparency" mode frequency response can be fine-tuned through the processes described herein.

In specific embodiments, the audio device 110 may be configured to be operable in the audio transparency mode and/or in a noise cancellation mode.

In specific embodiments, the audio device 110 may be implemented within a headset, headphones, a hearing aid, or a personal amplification device.

The headphones may, for example, be in-ear or over-ear. Over-ear headphones may comprise on-ear or circum-aural.

Figure 2:
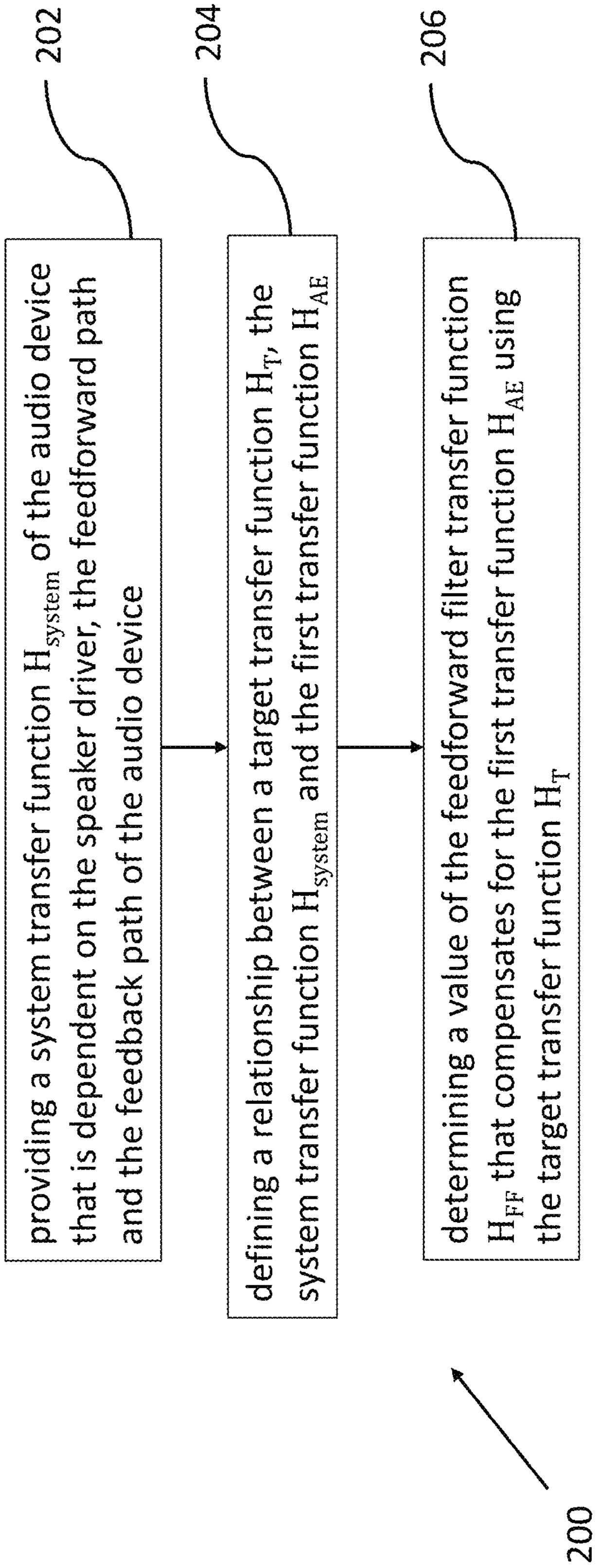
FIG. 2 is a flow chart of a method in accordance with a second embodiment of the present disclosure.

FIG. 2 is a flow chart of a method 200 of adjusting the feedforward filter transfer function $H_{FF}$ in accordance with a second embodiment of the present disclosure. The method 200 comprises providing a system transfer function $H_{system}$ of the audio device 110 that is dependent on the speaker driver 120, the feedforward path 122 and the feedback path 124, at a step 202.

The method 200 further comprises defining a relationship between a target transfer function $H_T$, the system transfer function $H_{system}$ and the transfer function $H_{AE}$, at a step 204.

For example, the relationship may be written as follows:

$$H_{system} \rightarrow H_T - H_{AE} \quad (1)$$

The target transfer function $H_T$ may be described as the final desired response of the audio device 110. To achieve the target transfer function $H_T$ the passive attenuation of the headphone (represented by $H_{AE}$) is subtracted from the target transfer function $H_T$.

The method 200 further comprises determining a value of the feedforward filter transfer function $H_{FF}$ that compensates for the first transfer function $H_{AE}$ using the target transfer function $H_T$, at a step 206. Step 206 may be performed, for example, using a regression method, such as a least squares method.

For example, a feedforward filter transfer function $H_{FF}$ may be determined to provide the transfer function of the system (the audio device 110) that compensates for the impact of $H_{AE}$, in accordance with equation (1).

Figure 3:
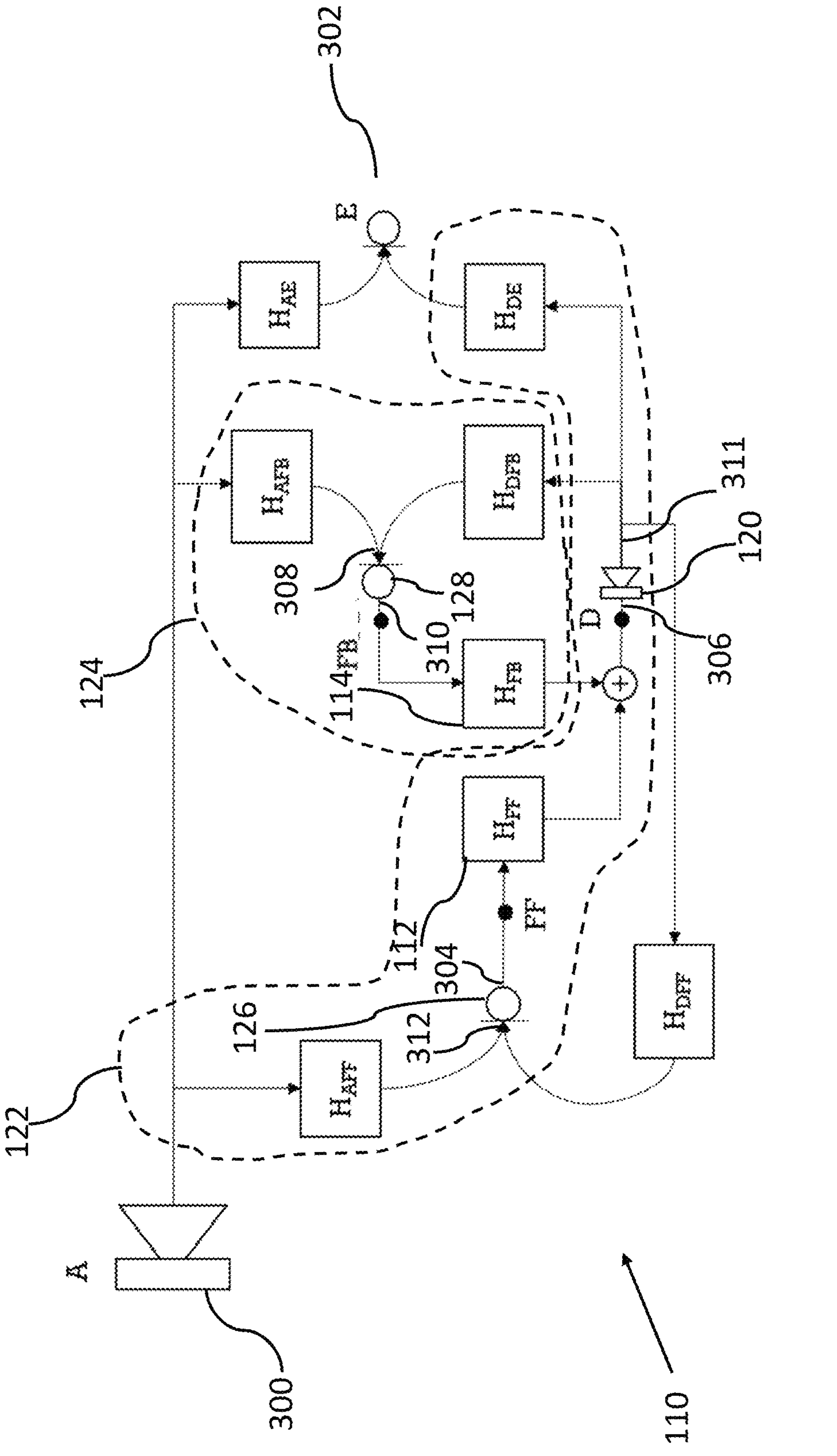
FIG. 3 is a schematic of a specific embodiment of the audio device of FIG. 1(*b*)

FIG. 3 is a schematic of a specific embodiment of the audio device 110.

In the present embodiment, the feedforward path 122 comprises a transfer function $H_{AFF}$ that is between an ambient noise source 300 and the feedforward microphone 126; and a transfer function $H_{DE}$ between the speaker driver 120 and a user's ear 302, when in use. The feedforward filter transfer function $H_{FF}$ is positioned between an output 304 of the feedforward microphone 126 and an input 306 of the speaker driver 120.

In the present embodiment, the feedback path 124 comprises a transfer function $H_{AFB}$ between the ambient noise source 300 and the feedback microphone 128; and a transfer function $H_{DFB}$ between an input 308 of the feedback microphone 128 and an output 311 of the speaker driver 120. The feedback filter transfer function $H_{FB}$ is positioned between an output 310 of the feedback microphone 128 and the input 306 of the speaker driver 120.

The audio device 110 further comprises the transfer function $H_{DFF}$ between the output 311 of the speaker driver 120 and an input 312 of the feedforward microphone 126.

As shown in FIG. 3, the transfer function $H_{DE}$ is positioned between the output 311 of the speaker driver 120 and the user's ear 302, when in use.

The feedforward path 122 describes the signal path from the ambient audio source 300 to the listener's ear 302 that implements feedforward filtering as provided by the inclusion of the feedforward filter 112 and the feedforward microphone 126. The different portions of the feedforward path 122 may be described in terms of their transfer functions, thereby providing a model for the feedforward path 122 that can be used to describe how a signal provided by the ambient audio source 300 is modified by the feedforward path as it passes to the listener's ear 302.

The feedback path 124 describes the signal path from the ambient audio source 300 to the user's ear 302 that implements feedback filtering as provided by the inclusion of the feedback filter 114 and the feedback microphone 128. The different portions of the feedback path 124 may be described in terms of their transfer functions, thereby providing a model for the feedback path 124 that can be used to describe how a signal provided by the ambient audio source 300 is modified by the feedback path 124 as it passes to the listener's ear 302.

In the present embodiment, the overall system frequency response at the listener's ear 302, as described by the transfer function $H_{system}$, may be defined as follows:

$$H_{system} = \frac{H_{AFF} \cdot H_{FF} + H_{AFB} \cdot H_{FB}}{1 - H_{DFF} \cdot H_{FF} - H_{DFB} \cdot H_{FB}} \cdot H_{DE} + H_{AE} \quad (2)$$

In a specific embodiment, the method 100 may further comprise acquiring at least one of the transfer functions $H_{AFF}$, $H_{DE}$, $H_{AFB}$, $H_{DFB}$, $H_{AE}$, $H_{DFF}$.

When the feedback filter path 124 is not active then:

$$H_{FB}=0 \quad (3)$$

A target transfer function for the system may be arbitrary and follow the design needs. In the literature there are several suggestions and a typical case is the Head Related Transfer Function (HRTF) response of a Head And Torso Simulator (HATS) or the individual open ear response of a human acquired via Microphone In Real Ear (MIRE) measurement. HRTF represents an open ear condition without a hearing device.

The methods disclosed herein can allow for the definition of computed targets that allow for mixed transparency and noise cancellation results. In the present disclosure, the proof of concept has been conducted with the HRTF as a target response but it will be appreciated that the methods disclosed herein may be implemented using other target response techniques. The target response may be defined by a designer.

In summary, the target curve can be related to the HRTF. Alternatively, a suitable algorithm can computationally determine and/or manipulate the target curve considering the hearing device acoustics or other specifications set by the designer.

In a further embodiment, the target curve may be manually designed.

In the present embodiment, the target response $H_T$ may be described by equation (1) as discussed previously. Equation (1) is written so as to subtract the passive frequency response $H_{AE}$ of the hearing device 110 on the listener's ear 302.

By reformulating equations (1) and (2) there is provided the following:

$$(H_{AFF}\cdot H_{DE}+H_T\cdot H_{DFF})\cdot H_{FF}\rightarrow H_T\cdot(1-H_{DFB}\cdot H_{FB})-H_{AFB}\cdot H_{FB}\cdot H_{DE} \quad (4)$$

Equation (4) may be rewritten as:

$$H_{FF}\rightarrow\frac{H_T\cdot(1-H_{DFB}\cdot H_{FB})-H_{AFB}\cdot H_{FB}\cdot H_{DE}}{H_{AFF}\cdot H_{DE}+H_T\cdot H_{DFF}} \quad (5)$$

Equation (5) may be used with a regression method to define the feedforward filter transfer function $H_{FF}$. The regression method may, for example, be a least square method, such as a least mean square method, and/or a weighted regression algorithmic method. The weighted values of the weighted regression algorithmic method may be user controlled by allowing a user to assign weight values over frequency points. The weighted method can allow a user to influence the final result.

An alternative but similar methodology that applies only for the case that a feedback filter 114 is present, can be based on the measurement of the device with the feedback filter path 112 enabled ($H_{AEFBon}$).

$H_{AEFBon}$ represents the result of the measurement from the ambient speaker 300 to the ear 302 when the path 124 is enabled, and therefore corresponds to $H_{AE}$ in FIG. 3, as measured with the path 124 is enabled.

This case will yield a different regression formula compared to equation (5).

First, the target response will be expressed by:

$$H_{system}=H_T-H_{AEFBon} \quad (6)$$

Equation (2) can be developed as shown below, if we assume that $H_{FF}=0$ when the FB path is measured, hence:

$$\frac{H_{AFF}\cdot H_{FF}}{1-H_{DFF}\cdot H_{FF}-H_{DFB}\cdot H_{FB}}\cdot H_{DE}\rightarrow H_T \quad (7)$$

The regression formula that is derived from equation (7) is as follows:

$$(H_{AFF}\cdot H_{DE}+H''_T\cdot H_{DFF})\cdot H_{FF}\rightarrow H''_T\cdot(1-H_{DFB}\cdot H_{FB}) \quad (8)$$

In a further embodiment of the present disclosure, designing the optimized feedforward filter 112 may further comprise determining a value of the feedforward filter transfer function $H_{FF}$ that provides a stable feedforward filter 112.

As expressed in equation (2) and in FIG. 3, $H_{system}$ is a dual closed loop response. The tuning of the feedback filter 114 is assumed stable. In order to provide a stable feedforward filter 112, the following gain margin and phase boundary conditions may be applied:

For the gain margin condition, for a given frequency $\omega_{ph}$ the following equation holds:

$$\arg(H_{DFF}(\omega_{ph})\cdot H_{FF}(\omega_{ph}))=-\pi \quad (9)$$

with a boundary condition being provided by:

$$|H_{DFF}(\omega_{ph})\cdot H_{FF}(\omega_{ph})|<1 \quad (10)$$

For the phase margin condition, for a given frequency $\omega_g$ the following equation holds:

$$|H_{DFF}(\omega_g)\cdot H_{FF}(\omega_g)|=1 \quad (11)$$

with a boundary condition being provided by:

$$\arg(H_{DFF}(\omega_g)\cdot H_{FF}(\omega_g))<-\pi \quad (12)$$

The above boundary conditions ensure stability of the feedforward filter design and the overall automated design procedure will reduce tuning effort, complexity and improve accuracy when compared with known systems.

The present embodiment provides increased stability compared to known methods which do not consider acoustic feedback through the feedforward filter path 122, which is characterised by the transfer function HDFF.

It will be appreciated that any of the steps as disclosed herein may be repeated to achieve a desired frequency response from the feedforward filter transfer function $H_{FF}$, in accordance with the understanding of the skilled person. The desired frequency response may, for example, be achieved by minimisation of an error relevant to a target curve. Optionally this can be achieved by appropriate algorithms relying on regression techniques in magnitude and phase. The referred algorithm can be optionally controlled by allowing the user to determine weight values over frequency points.

Figure 4:
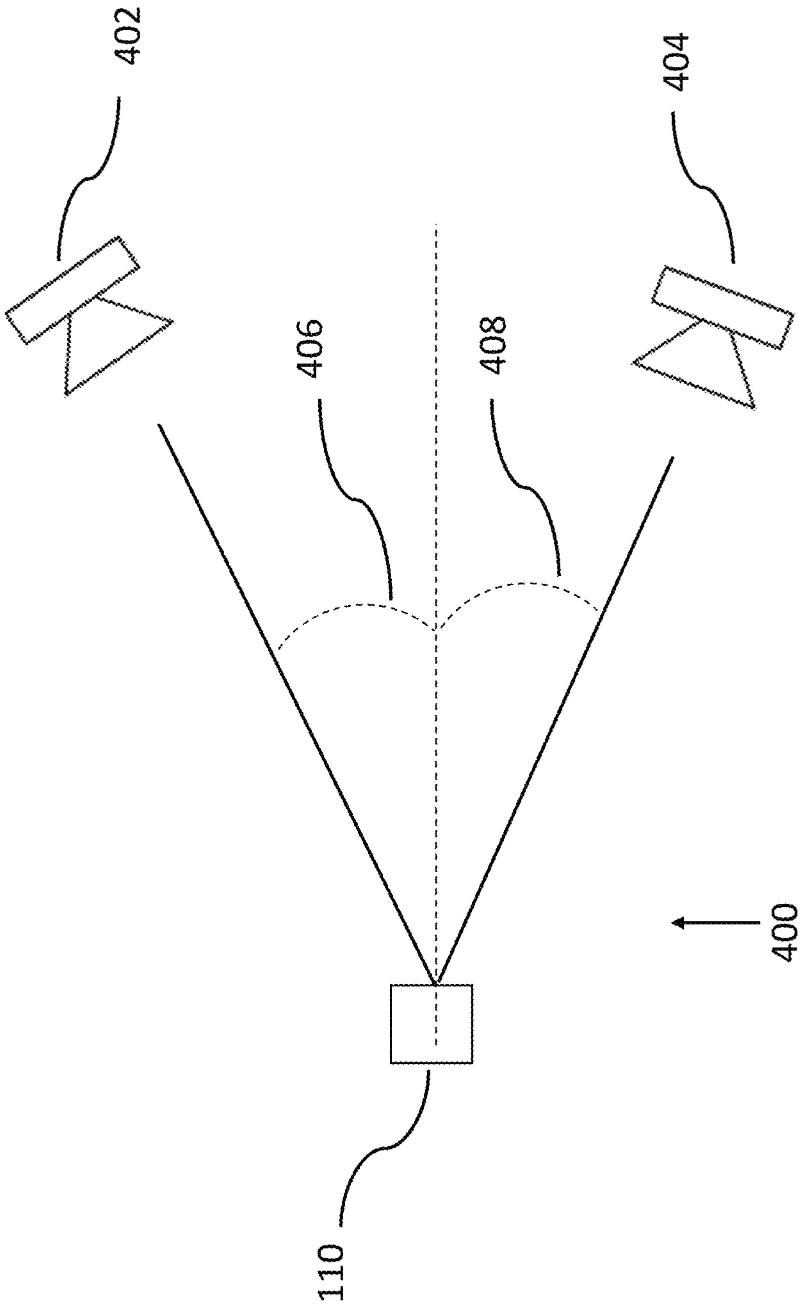
FIG. 4 is a schematic of an acoustic measurement setup for acquiring at least one transfer function.

FIG. 4 is a schematic of an acoustic measurement setup 400 for acquiring at least one of the transfer functions $H_{AFF}$, $H_{DE}$, $H_{AFB}$, $H_{DFB}$, $H_{AE}$, $H_{DFF}$. The measurement setup 400 comprises ambient noise sources 402, 404 that are received at the audio device 110 at incident angles 406 and 408, respectively.

The transfer function measurements may align with a specific angle of arrival. A transparency filter tuning that relies on only one angle may bring distortion and source localization issues.

In a specific embodiment of the present disclosure, acquiring at least one of the transfer functions may comprise, measuring the transfer function, or transfer functions, over a plurality of incident angles 406, 408, and then determining the average transfer function, or average transfer functions. One or both of a magnitude average or a phase average may be determined.

The present embodiment can compensate for the issues relating to transfer function determination from a single angle by allowing for an angle averaged filter design.

Measurements for several angles, ideally both horizontal and vertical, will typically be provided by a designer.

The following equation provides the magnitude average of a given transfer function which relies on the spectral density of the individual responses:

$$|H_{angleavg}| = 20\log_{10}\left|\sqrt{\frac{1}{N}\sum_{1}^{N}|H_k(\varphi, \theta)|^2}\right| \quad (13)$$

where N is the total number of angles measured.

Concerning the phase average, it can be computed by the following equation based on the unwrapped phase response of each individual measurement:

$$\arg(H_{angleavg}) = \frac{1}{N}\sum_{1}^{N}\arg(H_k(\varphi, \theta)) \quad (14)$$

Figure 5:
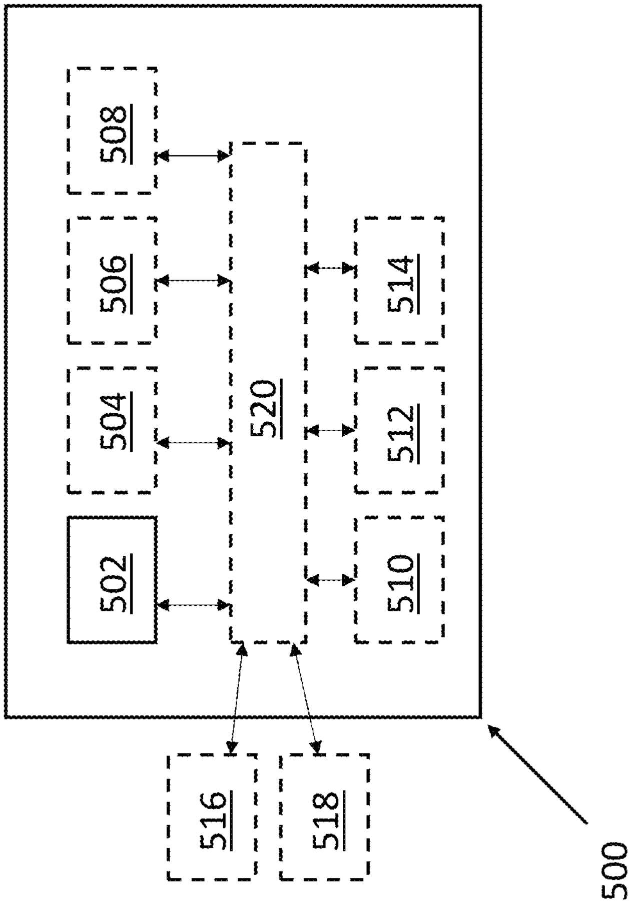
FIG. 5 is a schematic of a computer system comprising a module configured as an automatic feedforward filter design tool, in accordance with a third embodiment of the present disclosure.

FIG. 5 is a schematic of a computer system 500 comprising a module 502 configured as an automatic feedforward filter design tool, in accordance with a third embodiment of the present disclosure.

The tool may be configured to carry out the steps of the methods described herein.

The computer system 500 may comprise a processor 504, a storage device 506, RAM 508, ROM 510, a data interface 512, a communications interface 514, a display 516, and an input device 518. The computer system 500 may comprise a bus 520 to enable communication between the different components.

The computer system 500 may be configured to load an application. The instructions provided by the application may be carried out by the processor 504. The application may be the automatic feedforward filter design tool.

In a specific embodiment, the computer system 500 may comprise circuitry for measuring the ambient surroundings, as previously discussed in relation to the FIG. 4, where the circuitry functions to determine appropriate weightings to be applied in the regression method, and then performs automatic adjustments until optimisation is attained. In further embodiments, the weightings may be provided from an external source and/or may be user-controlled.

A user may interact with the computer system 500 using a user interface, for example provided by the display 516 and the input device 518, to instruct the computer system 500 to implement the methods of the present disclosure in the optimisation of a transparency mode of operation system.

In an alternative embodiment, the user interface may otherwise be provided, for example by a wireless or wired communication interface to permit the user to interact with the computer system 500 using an external device, such as a smart phone.

The user interface may enable the user to adjust one or more parameters of the tool relating to the optimisation of the feedforward filter as part of the design process. For example, the interface may permit the user to adjust settings relating to the methods as disclosed herein such as the weightings of a regression algorithm.

Data may be stored in a memory element, for example provided by the storage device 506 of the computer system 500. The data may include, for example, the transfer functions as measured, such as the transfer functions $H_{DE}$, $H_{AFB}$, $H_{DFB}$, $H_{AE}$, as may be implemented in the method as disclosed herein.

Figure 6A:
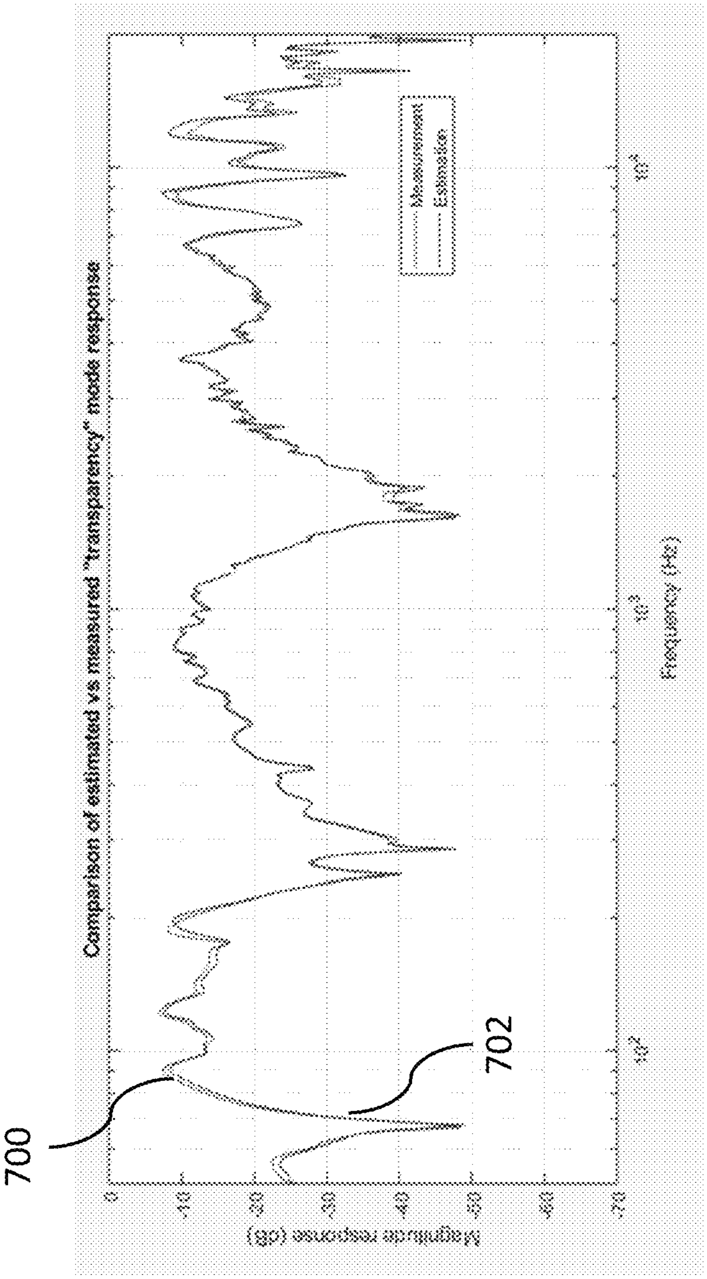
FIG. 6(*a*) is a first graph of magnitude response versus frequency for a measurement and an estimation transparency mode response, FIG. 6(*b*) is a second graph of magnitude response versus frequency for a measurement and an estimation transparency mode response, FIG. 6(*c*) is a screenshot of a graphical user interface (GUI) that may be used with the methods disclosed herein
Figure 6B:
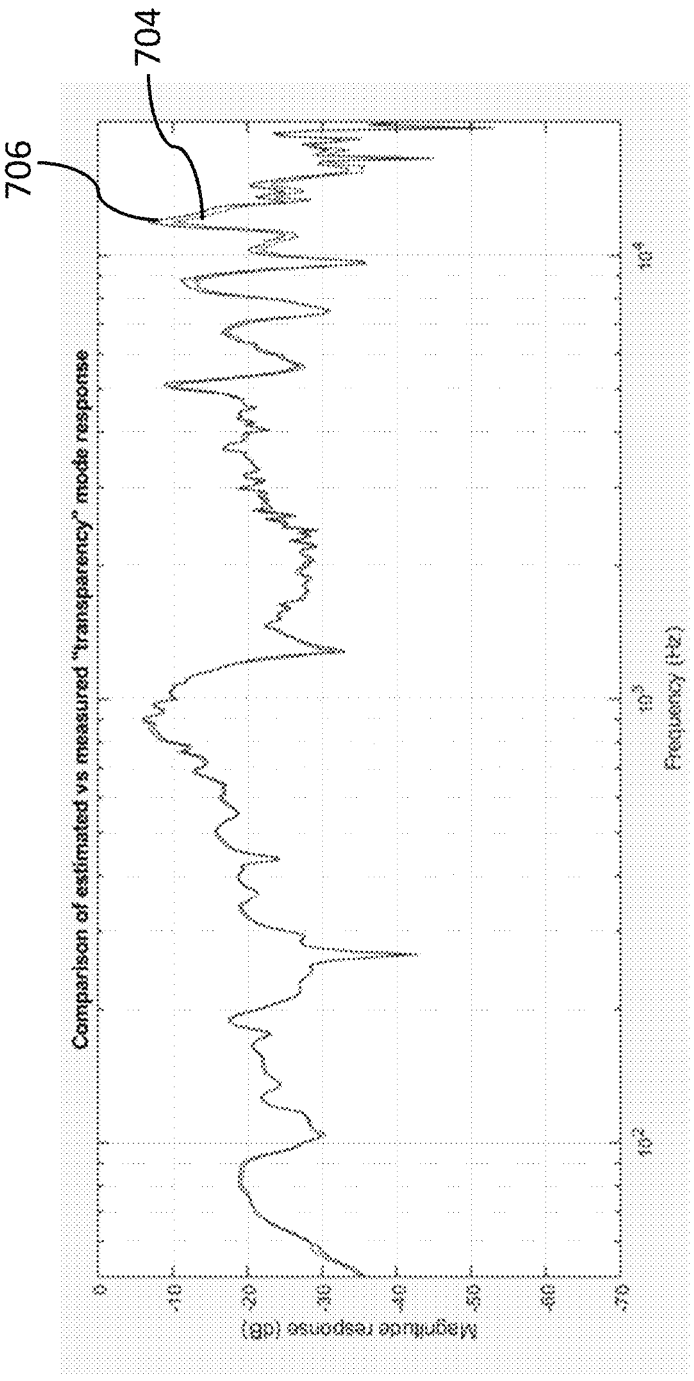
Figure 6C:
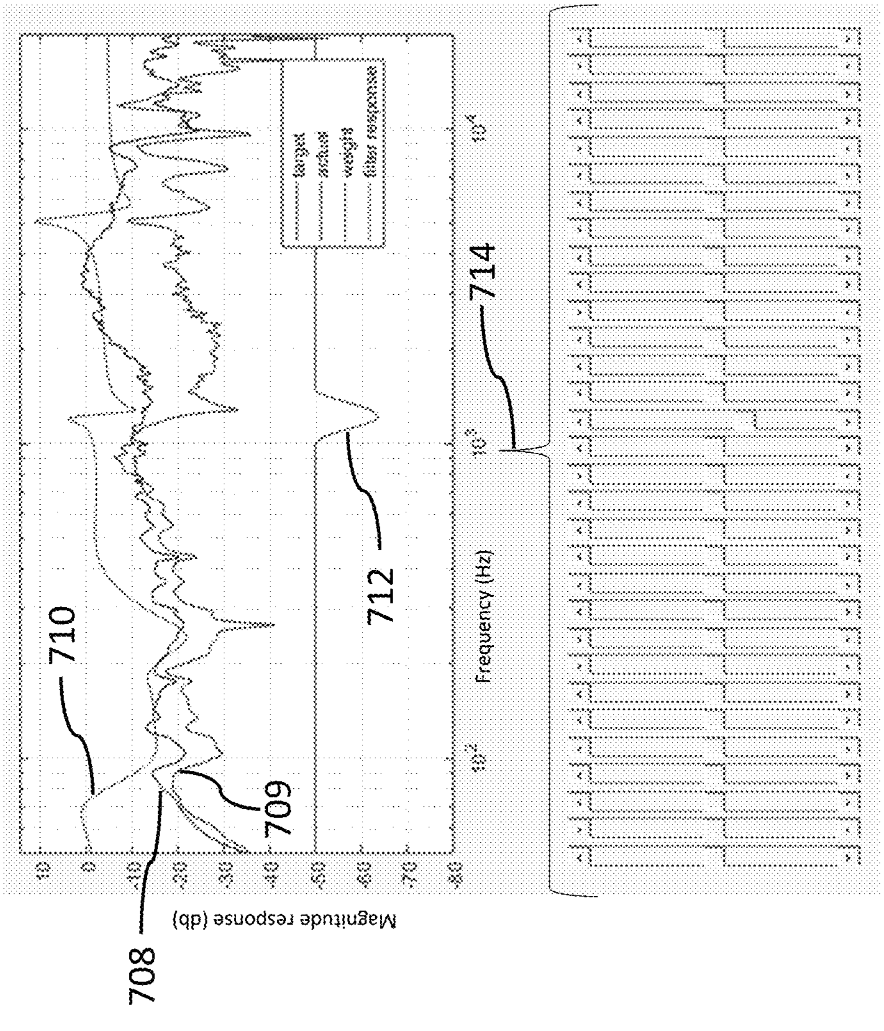

FIG. 6(*a*) is a graph of magnitude response versus frequency for a measurement 700 and an estimation 702 transparency mode response.

FIG. 6(*a*) shows the estimation vs measured frequency response for the method disclosed herein, in "transparency" mode operation for the case of a feedforward filter only system. It will be appreciated that this is only an example and not a well-tuned result.

FIG. 6(*b*) is a graph of magnitude response versus frequency for a measurement 704 and an estimation 706 transparency mode response.

FIG. 6(*b*) shows the measured vs estimated response for a feedforward filter and a feedback filter combined system in "transparency" mode.

FIGS. 6(*a*) and 6(*b*) provide a comparison between the estimation and a real measurement of the system reception at the eardrum position. They illustrate the accuracy that the methods disclosed herein can yield in estimating the final response with and without the feedback path operation.

FIG. 6(*c*) is a screenshot of a graphical user interface (GUI) that may be used with the methods disclosed herein, in accordance with the understanding of the skilled person. In operation a user may control the interface to achieve a tuning of the feedforward filter and optimize the transparency mode response. The GUI may be used for fine-tuning the weights of the automated feedforward filter design for transparency mode.

FIG. 6(*c*) shows a target response 708, for example corresponding to $H_T$; a system response 70, for example corresponding to $H_{system}$; a feedforward filter response 710, for example corresponding to $H_{FF}$; and weights for the approximation of the system towards the target (labelled 712). The weights can achieve variable precision in frequency bands defined by the position of the sliders (labelled 714).

The methods disclosed herein may be applied by a manufacturer of the audio device 110, and/or may be applied for fine-tuning an end product to meet the requirements of the end-user, by the end-user.

The methods described herein resolve issues with known systems without the need to introduce complicated measurements or real time adaption.

Embodiments of the methods described herein can be used to design a feedforward filter to provide an accurately estimated, controllable and stable transparency frequency response. The estimated frequency response for the "transparency" operation by the proposed design methodology is accurate and verified by suitable measurements.

Embodiments of the methods described herein consider the role of the feedback path 124 in the overall frequency response of the audio device 110. The feedback path 124 can influence the system transfer function $H_{system}$ of the audio device 110 and can therefore distort the parameters of the feedforward operation if it is not accounted for appropriately, and as provided by embodiments of the methods disclosed herein.

Embodiments of the methods described herein also consider the phase characteristics as a combination result of the feedback and feedforward paths. The phase characteristics cannot be correctly estimated by simply combining the separate frequency response of each path, such that embodiments of the present disclosure provide increased accuracy compared to methods that do not consider phase characteristics.

In summary, embodiments of the methods disclosed herein can provide an automated design tool for the feedforward path 122, that can apply stability criteria to the filter 112 to prevent acoustic feedback on the hearing device 110, and may also consider averaging for the angle of arrival of the external sound.

Various improvements and modifications may be made to the above without departing from the scope of the disclosure.

The invention claimed is:

1. A computer-implemented method for automatically designing a feedforward filter that is optimized for an audio transparency mode of operation of an audio device, the audio device comprising the feedforward filter and a feedback filter, the method comprising:

automatically designing the feedforward filter; and optimizing the feedforward filter for the audio transparency mode of operation, wherein optimization of the feedforward filter is dependent on the feedback filter;

wherein:

optimizing the feedforward filter comprises determining one or more properties of the feedforward filter, the one or more properties of the feedforward filter comprising a feedforward filter transfer function;

a property of the feedback filter comprises a feedback filter transfer function, and the determination of the feedforward filter transfer function is dependent on the feedback filter transfer function;

the audio device comprises:

i) a speaker driver;

ii) a feedforward path comprising the feedforward filter and a feedforward microphone;

iii) a feedback path comprising the feedback filter and a feedback microphone; and iv) a first transfer function, the first transfer function being a passive frequency response of the audio device on a listener's ear; and the feedforward filter transfer function is designed to compensate for the first transfer function, thereby optimizing the feedforward filter for the audio transparency mode of operation.

2. The computer-implemented method of claim 1, wherein the feedforward filter transfer function is determined by determining one or more filter coefficients of the feedforward filter.

3. The computer-implemented method of claim 1, wherein determining the feedforward filter transfer function comprises:

providing a system transfer function of the audio device that is dependent on the speaker driver, the feedforward path and the feedback path of the audio device;

defining a relationship between a target transfer function, the system transfer function and the first transfer function; and determining a value of the feedforward filter transfer function that compensates for the first transfer function using the target transfer function.

4. The computer-implemented method of claim 3, wherein determining the value of the feedforward filter transfer function that compensates for the first transfer function using the target transfer function comprises applying a regression method.

5. The computer-implemented method of claim 1, wherein:

a) the feedforward path comprises:

i) a second transfer function between an ambient noise source and the feedforward microphone;

ii) the feedforward filter transfer function between an output of the feedforward microphone and an input of the speaker driver;

iii) a third transfer function between the speaker driver and a user's ear; and:

b) the feedback path comprises:

i) a fourth transfer function between the ambient noise source and the feedback microphone;

ii) the feedback filter transfer function between an output of the feedback microphone and the input of the speaker driver; and iii) a fifth transfer function between an input of the feedback microphone and an output of the speaker driver; and the audio device further comprises:

the first transfer function between the ambient noise source and the user's ear; and a sixth transfer function between the output of the speaker driver and an input of the feedforward microphone.

6. The computer-implemented method of claim 5, wherein optimizing the feedforward filter comprises:

determining a value of the feedforward filter transfer function that provides a stable feedforward filter.

7. The computer-implemented method of claim 6, wherein determining the value of the feedforward filter transfer function that provides a stable feedforward filter comprises:

determining a value of the feedforward filter transfer function that provides:

i) an argument of a multiplication of the feedforward filter transfer function and the sixth transfer function for a first phase frequency that is equal to minus pi and a magnitude of the multiplication of the feedforward filter transfer function and the sixth transfer function for the first phase frequency that is less than one; or ii) an argument of the multiplication of the feedforward filter transfer function and the sixth transfer function for a first gain frequency that is less than minus pi and a magnitude of the multiplication of the feedforward filter transfer function and the sixth transfer function for the first gain frequency that is equal to one.

8. The computer-implemented method of claim 5 comprising acquiring at least one of the first, second, third, fourth, fifth or sixth transfer functions.

9. The computer-implemented method of claim 8, wherein acquiring the at least one of the first, second, third, fourth, fifth or sixth transfer functions comprises:

measuring the at least one of the first, second, third, fourth, fifth or sixth transfer functions over a plurality of incident angles; and determining an average of the at least one of the first, second, third, fourth, fifth or sixth transfer functions measured over the plurality of incident angles.

10. The computer-implemented method of claim 9, wherein determining an average of the at least one of the first, second, third, fourth, fifth or sixth transfer functions comprises determining a magnitude average and/or determining a phase average.

11. The computer-implemented method of claim 1, comprising optimizing the feedback filter prior to optimizing the feedforward filter.

12. The computer-implemented method of claim 11, wherein optimizing the feedback filter comprises determining one or more properties of the feedback filter.

13. The computer-implemented method of claim 12, wherein the one or more properties of the feedback filter comprise a feedback filter transfer function.

14. A computer system comprising a module configured as an automatic feedforward filter design tool for designing a feedforward filter of an audio device, the audio device comprising the feedforward filter and a feedback filter, the tool being configured to optimize the feedforward filter for an audio transparency mode of operation wherein, optimization of the feedforward filter is dependent on the feedback filter;

wherein:

optimizing the feedforward filter comprises determining one or more properties of the feedforward filter, the one or more properties of the feedforward filter comprising a feedforward filter transfer function;

a property of the feedback filter comprises a feedback filter transfer function, and the determination of the feedforward filter transfer function is dependent on the feedback filter transfer function;

the audio device comprises:

i) a speaker driver;

ii) a feedforward path comprising the feedforward filter and a feedforward microphone;

iii) a feedback path comprising the feedback filter and a feedback microphone; and iv) a first transfer function, the first transfer function being a passive frequency response of the audio device on a listener's ear; and the feedforward filter transfer function is designed to compensate for the first transfer function, thereby optimizing the feedforward filter for the audio transparency mode of operation.

15. The computer system of claim 14, wherein the audio device is configured to be operable in the audio transparency mode and/or in a noise cancellation mode.

16. The computer system of claim 14, wherein the audio device is implemented within a headset, headphones, a hearing aid, or a personal amplification device.

17. A non-transitory computer-readable storage medium comprising instructions which, when executed by a computer, cause the computer to carry out the steps of:

automatically designing a feedforward filter; and optimizing the feedforward filter for the audio transparency mode of operation, wherein optimization of the feedforward filter is dependent on a feedback filter;

wherein:

optimizing the feedforward filter comprises determining one or more properties of the feedforward filter, the one or more properties of the feedforward filter comprising a feedforward filter transfer function;

a property of the feedback filter comprises a feedback filter transfer function, and the determination of the feedforward filter transfer function is dependent on the feedback filter transfer function;

audio device comprises i) a speaker driver;

ii) a feedforward path comprising the feedforward filter and a feedforward microphone;

iii) a feedback path comprising the feedback filter and a feedback microphone; and iv) a first transfer function, the first transfer function being a passive frequency response of the audio device on a listener's ear; and the feedforward filter transfer function is designed to compensate for the first transfer function, thereby optimizing the feedforward filter for the audio transparency mode of operation.

* * * * *